United States Patent [19]

Jenkins

[11] Patent Number: 4,830,455
[45] Date of Patent: May 16, 1989

[54] JOINTING ARRANGEMENT

[75] Inventor: Peter D. Jenkins, Woodbridge, England

[73] Assignee: British Telecommunications public limited company, Great Britain

[21] Appl. No.: 762,197

[22] PCT Filed: Nov. 15, 1984

[86] PCT No.: PCT/GB84/00394
§ 371 Date: Jul. 17, 1985
§ 102(e) Date: Jul. 17, 1985

[87] PCT Pub. No.: WO85/02269
PCT Pub. Date: May 23, 1985

[30] Foreign Application Priority Data

Nov. 17, 1983 [GB] United Kingdom ............... 8330668

[51] Int. Cl.$^4$ .......................... G02B 6/36; G02B 7/26
[52] U.S. Cl. .................................................. 350/96.20
[58] Field of Search ............... 350/96.20, 96.21, 96.22

[56] References Cited

U.S. PATENT DOCUMENTS 4,648,688  3/1987  Ashman ........................... 350/96.21

FOREIGN PATENT DOCUMENTS 0017319  10/1980  European Pat. Off. .
2027932   2/1980  United Kingdom .
2034068   5/1980  United Kingdom .
2091901   8/1982  United Kingdom .

OTHER PUBLICATIONS

Patents Abstracts of Japan, vol. 6, No. 233 (P-156) (1111), Nov. 19, 1982, & JP-A 57 133 418 (Nippon Denshin Denwa Kosha) (18-08-1982).
I.S.A. Transactions, vol. 21, No. 3, 1982, Research Triangle Park, N.C., (U.S.), 1982, Research Triangle Park, N.C. (U.S.), G. Wilkins et al., "Design and Performance of an Undersea, Single-Fiber Multi-Repeater, Full Duplex, Electro-Optical Data Link", pp. 3-19.

Primary Examiner—William L. Sikes
Assistant Examiner—Robert E. Wise
Attorney, Agent, or Firm—Nixon & Vanderhye

[57] ABSTRACT

Optical fibre joints to an optical fibre submarine cable repeater are made outside the repeater housing in a separate flexibly-connected jointing arrangement. Thus, if repairs are needed, new fibre joints can be made without the need to rethread an entire gimbal assembly and disassemble an entire repeater housing and/or without the need to splice in an extra length of optical fibre cable thus incurring extra joint losses due to the repair.

17 Claims, 4 Drawing Sheets

JOINTING ARRANGEMENT

The invention relates to jointing arrangements between repeater housings and submarine cables. In particular it relates to such arrangements between repeater housings and submarine optical fibre cables.

Known repeater housings, once installed on a cable, constitute a rigid section in the cable. It is advantageous to keep rigid sections in the cable as short as possible because handling is made easier. For instance, in bow laying of a cable from a ship, the cable must pass round a winch drum. Clearly, rigid sections are not able to conform to the circumference of a winch drum and, above a certain length (determined in part by the diameter of the drum concerned), they must be manoeuvred to bypass the drum altogether. Increasing the width to length ratio of a rigid section, effectively reducing its length, is not an ideal design approach since changes in diameter in a cable can also generate handling difficulties.

Further, it is advantageous that joints affecting a submarine cable, which are to be submerged, should be capable of being disassembled and remade at sea for repair and maintenance purposes. Known cable to cable joints can be so treated but known cable to repeater housing joints require a special termination to be attached to the cable end at the factory. If such a joint has to be disassembled, on an installed cable, the original termination cannot be re-used at sea and must be replaced. To do that a short length of cable, or cable tail, is supplied which has had such a termination attached at the factory. The cable tail can be jointed at sea to the free end of the installed cable by means of a cable to cable joint and the new termination used to reinstall the cable to repeater housing joint.

Although the above, known, cable to repeater housing joint may avoid an optical fibre joint outside the repeater housing at first instance, because of the necessary repair procedure such a joint must be allowed for anyway at the cable design state. That is, in calculating signal loss along the installed cable for the purposes of, for instance, choosing repeater separation distances, the potential repair-generated joints must still be taken into account.

It is an object of the present invention to facilitate handlign of a submarine cable with a repeater installed, by use of for instance a winch drum.

It is a further object of the present invention to facilitate disassembly and reinstallation of a joint between a repeater housing and a submarine cable.

According to the present invention, there is provided a jointing arrangement, for use between an optical fibre submarine cable and a repeater housing, characterised in that it comprises a termination assembly for such a cable including means for attachment of the tensile load carrying components of the cable and support means for an optical fibre joint between a fibre from a cable thus terminated and a second fibre, the termination assembly being provided with a hose which is adapted to receive such a second fibre.

Embodiments of the present invention have the advantage that a repeater housing and its associated cable jointing equipment constitute three rigid sections which are separated from each other by flexible links, the links allowing a bend of up to, say, 90° to occur between the rigid sections. This can greatly facilitate cable handling once a repeater is installed.

In use, the hose is preferably mounted on a bulkhead of the repeater housing and, advantageously, the hose may be provided at the factory with mounting means by which it may be so mounted.

Preferably the hose is adapted to receive the second fibre slidably.

An advantage of embodiments of the present invention incorporating the latter preferable feature is the manner in which optical fibres can be mounted in the hose. If they can be manoeuvred by sliding along the hose, it is possible that individual fibres may be removed from and replaced in the jointing arrangement without either significant disturbance of other fibres connected to the same repeater apparatus or the introduction of a further optical fibre joint. Such an operation may be necessary for instance if one fibre is attached to a defective optical device at the repeater apparatus.

According to the present invention, there is further provided a joint between an optical fibre submarine cable and a repeater housing comprising a jointing arrangement according to an embodiment of the present invention as described above.

Preferably the hose of the jointing arrangement is mounted on the repeater housing, for instance on the bulkhead, such that the bore of the hose terminates at a feedthrough arrangement for feeding an optical fibre into the repeater housing in a hermetically sealed manner.

Also preferably the joint further comprises an optical fibre which is jointed, at one end, to an optical fibre from the cable, at the termination assembly, and which extends through the bore of the hose slidably, and through the feedthrough arrangement, to be connected at its other end to repeater apparatus in the repeater housing.

A preferred embodiment of a jointing arrangement according to the invention will now be described by way of example, with reference to the accompanying figures in which.

Figure 1:
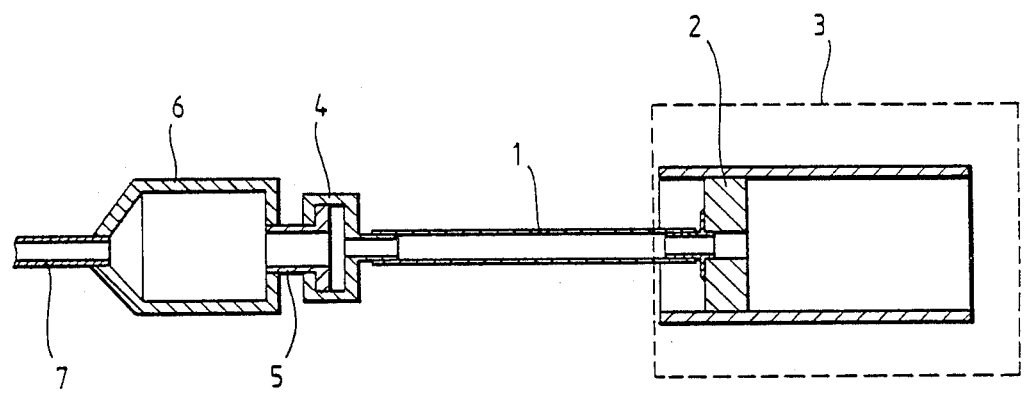
FIG. 1 shows a schematic representation of the complete jointing arrangement.

Referring to FIG. 1, the jointing arrangement comprises a flexible hose 1 which is attached at one end to a bulkhead 2 of a repeater housing 3 (shown in part only). At the other end, the hose 1 is attached via a tension transfer housing 4 and coupling 5 to one end of a modified cable to cable joint 6, hereinafter referred to as an MCCJ, to the othr end of which is attached a submarine optical fibre cable 7.

Figure 2:
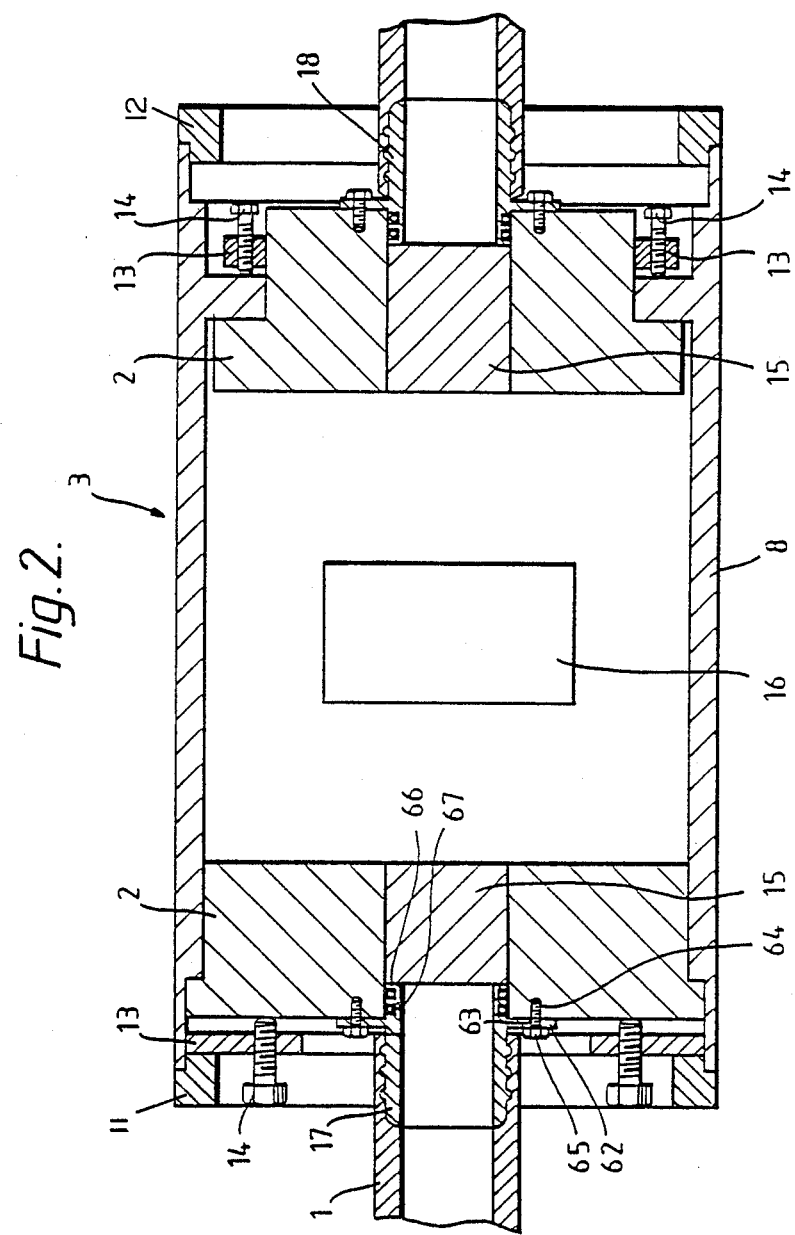
FIG. 2 shows a repeater housing attached at one end only to a first element of the jointing arrangement.

Referring to FIG. 2, the repeater housing 3 is of the type described in our copending patent application No. 8320947 and comprises a tubular member 8, two bulkheads 2, bulkhead fastening means 13, 14, and protective endcaps 11, 12. Each bulkhead 2 provides mounting 15 for power and signal feed through from the seaward face of the bulkhead 2 to the repeater equipment 16 inside the housing 3.

The mounting 15 for power and signal feed through is accommodated in a bore in each bulkhead 2. On the seaward face of each bulkhead 2, there is mounted a tubular clamping member 17, 18 and one of these members 17 provides an attachment point for the jointing arrangement of this description.

The tubular clamping member 17 is mounted, by means of an external annular flange 62, so as effectively to extend the bore in the bulkhead 2. The flange 62 has a regular array of apertures 63 therethrough, running parallel to the longitudinal axis of the bore in the bulkhead 2. The seaward face of the bulkhead 2 is provided with a complementary array of screw-threaded recesses 64. Bolts 65 are provided, whose shafts are screw-threaded in a region adjoining their ends, which pass through the apertures 63 and screw into the recesses 64, thereby holding the tubular clamping member 17 in place.

The clamping member 17 is also provided with a tubular projection 66 which extends into the bore in the bulkhead 2 and is concentric therewith. Seals 67, in the form of 'O' rings seated in annular grooves on the external surface of the projection 66, are provided between the wall of the bore and the projection 66.

Externally, the tubular clamping member 17 is circumferentially corrugated and one end of the flexible hose 1 of the jointing arrangement is retained on the tubular clamping member 17 by a conventional swaged ferrule technique (not shown in Figures), the tubular clamping member 17 being inserted into the bore 20 of the hose 1.

The flexible hose 1 may be of any suitable construction but it must be capable of withstanding the external pressures, for instance of up to 78 Mega Newtons per metre squared, to which it may be subjected in use. It is suggested that a minimum collapse pressure of twice that value should be considered necessary to achieve sufficient reliability. It must also be capable of reliably supporting the maximum tensile load that is likely to be exerted on the submarine optical fibre cable, for instance when it is laid or recovered. Such a load can be for example 500 kilo Newtons.

Figure 3:
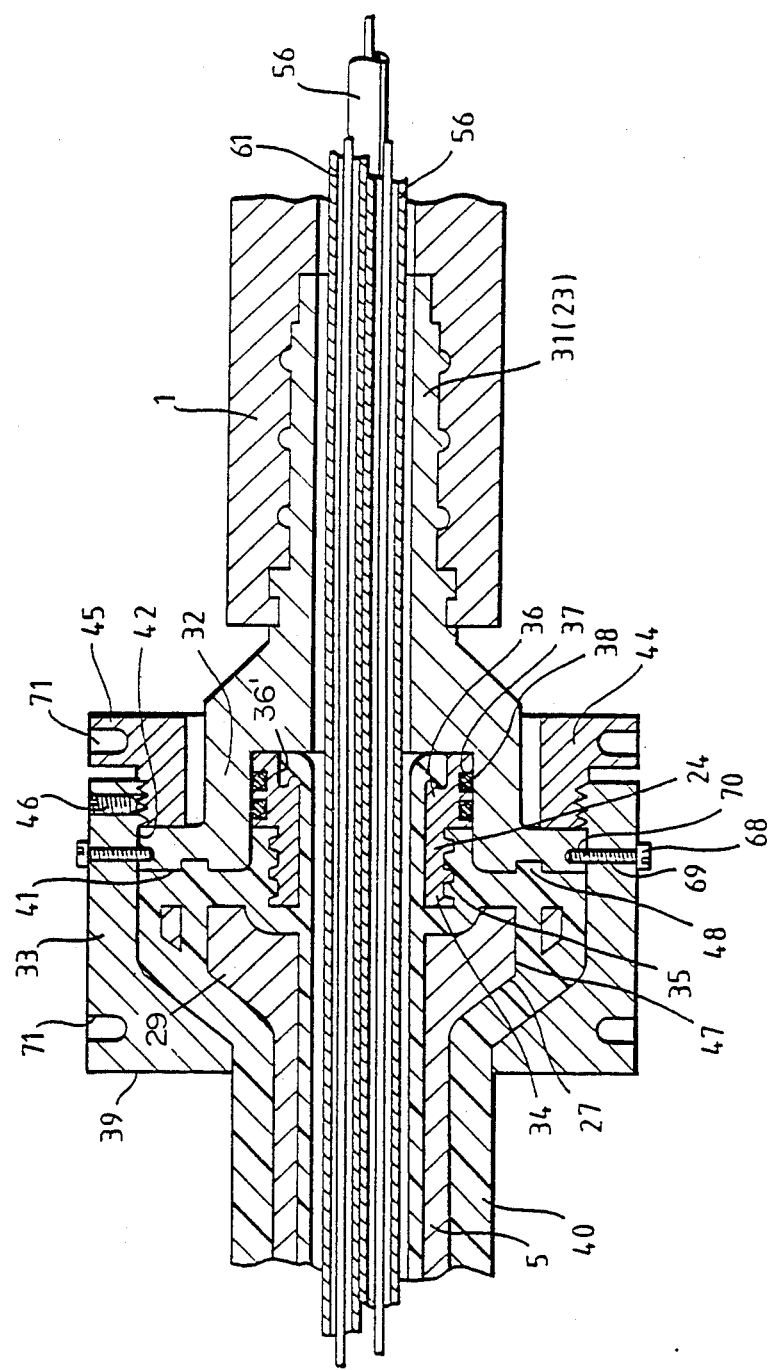
FIG. 3 shows a tension transfer housing for use in the jointing arrangement.

Referring to FIG. 3, at its second end, the flexible hose 1 is again retained by a conventional swaged ferrule technique (not shown in FIGS.) on an externally corrugated tubular member 23 of substantially the same nature as the member 17 mounted on the repeater housing bulkhead 2. The member 23 in this case however forms part of the tension transfer housing 4.

The tension transfer housing 4, in cooperation with the coupling 5, has the primary function of providing an electrically insulated, tensile load bearing joint between the MCCJ 6 which is at system potential, in use, and the flexible hose 1 which is at earth potential, in use. System potential may typically be 10 kV. The housing 4 comprises a tubular member of generally circular cross-section whose internal diameter shows two consecutive increases, the wall thickness of the tubular member being substantially constant. The housing 4 is therefore effectively in the form of first, second and third connected cylinders which increase progressively in diameter. The first cylinder 31 forms the tubular member 23 on which the flexible hose 1 is retained, the second cylinder 32 provides a mounting for a waterproof gland 24 and the third cylinder 33 provides part of the load bearing junction, via the coupling 5, between the flexible hose 1 and the MCCJ 6. The waterproof gland 24 is intended to prevent water ingress via the tension transfer housing 4 to a vulnerable region of the jointing arrangement.

The dimensions of the first cylinder 31 are selected such that its bore is substantially equal to that of the flexible hose 1 and its external diameter accommodates the mounting and retaining of the hose 1 in a convenient manner.

Inside the second cylinder 32, coaxially mounted therewith and sealingly engaged against its internal surface, is the waterproof gland 24. The gland 24 involves known forms of construction and comprises a hollow cylindrical member whose external surface is divided circumferentially into two regions. In a first region 34, the external surface is provided with circumferential ribs 35 of trapezoidal cross-section and its diameter is less than that of the internal surface of the second cylinder 32. In a second region 36, the external surface abuts the internal surface of the second cylinder 32 and is provided with two circumferential grooves 37 of rectangular cross-section, in each groove 37 there being seated an 'o' ring 38. The 'o' rings 38 are sealingly engaged against the internal surface of the second cylinder 32.

Inside the third cylinder 33, coaxially mounted therewith, is a head portion 29 of the coupling 5. The coupling 5 extends from the region of the MCCJ 6 in the form of a tube and the head portion 29 is formed by an out-turned flange at the end of, and integral with, the tube. The third cylinder 33 is provided with a complementary in-turned flange 39 which overlaps the out-turned flange of the head portion 29, lying on the side of the head portion 29 towards the MCCJ 6. The head portion 29 is thus substantially enclosed by the third cylinder 33 and its in-turned flange 39.

The third cylinder 33 of the transfer housing 4 is demountable. This is necessary to allow assembly of the housing 4 around the head portion 29 of the coupling 5. Between the second and third cylinders 32, 33 extends an annular flange 41 which is formed by the out-turned end of the second cylinder 32. The flange 41 has a cylindrical outer surface 42 on which the third cylinder 33 is slidably mounted. The wall of the third cylinder 33 is extended beyond the flange 41 and in order to retain the flange 41 inside the third cylinder 33 against the tensions to which the transfer housing 4 will be subjected in use, a retaining ring 44 is provided. The retaining ring 44 comprises a cylindrical body with an external screw-thread. The extended portion of the third cylinder 33 is provided with a complementary, internal screw-thread and the ring 44 is dimensioned such that it can be screwed into the extended portion of the third cylinder 33 to a position in which it abuts the flange 41.

It is convenient that the retaining ring 44 should, in use, protrude slightly from the end of the third cylinder 33 and be provided with a thickened end portion 45 whose external diameter matches that of the third cylinder 33. A grub screw 46 is provided in the extended portion of the third cylinder 33 which screw 46 can be tightened against the retaining ring 44 in order to hinder its rotation in use. In addition, a ring of screws 68 is provided, each screw 68 being accommodated in a screw-threaded radial bore 69 in the wall of the third cylinder 33. When the transfer housing 4 is assembled, each radial bore 69 is extended by a recess 70 provided in the outer surface 42 of the flange 41. The screws 68, on being adjusted so as to project into their respective recesses 70, will act to prevent relative rotation between the second and third cylinders 32, 33.

In order to facilitate assembly of the transfer housing 4, further recesses 71 are provided in the outer cylindrical surfaces of the flange 41 and the third cylinder 33. Into these recesses 71 suitable tools may be inserted for the purpose of screwing the retaining ring 44 into position.

The polythene layer 40 which encapsulates the MCCJ 6 is extended to cover all surfaces of the coupling 5, excluding only those made inaccessible in use by the joint between the coupling 5 and the MCCJ 6. In the region of the tension transfer housing 4, therefore, the polythene layer 40 lies between the in-turned flange 39 of the third cylinder 33 and the head portion 29 of the coupling 5 and between the annular plate 41 and said head portion 29. The polythene layer 40 also extends into the second cylinder 32, surrounding the first region 34 of the waterproof gland 24 and covering the internal surface of the second region 36. It is convenient, for instance for assembly purposes, that the internal surface of the second region 36 should be provided with a circumferential groove 36' of keyhole type cross-section into which the polythene layer 40 also extendsand by which the layer 40 is retained. The circumferential ribs 35 of the first region 34 of the waterproof gland 24 lead to local stress concentrations in the polythene layer 40, in use, which considerably enhance the seal obtained against water penetration. This type of seal construction is known and is described for instance in the following publication: "Glands for the Entry of Electrical Cables into Pressure Vessels Containing or Surrounded by Conductign Liquids" by H H Grunwald, Institution of Mechanical Engineers Proceedings, Volume 172, No. 12, starting at page 487.

In order to prevent relative rotation between the head portion 29 of the coupling 5 and the polythene layer 40, a number of holes 47 are provided in the out-turned flange which constitutes the head portion 29 and the polythene layer 40 extends through these holes. Recesses 48 are provided in the annular plate 41 into which the polythene layer 4C also extends, which act to inhibit relative rotation between the second cylinder 32 and the coupling 5.

The polythene layer 40 as described above can be seen to separate completely the head portion 29 of the coupling 5 from the transfer housing 4, providing the electrical insulation required between the MCCJ 6 and the flexible hose 1.

Passing through the head portion 29 of the coupling 5 and the tension transfer housing 4 is a nylon duct 61 and a number of insulated copper wires 56. These are referred to in more detail below.

Figure 4:
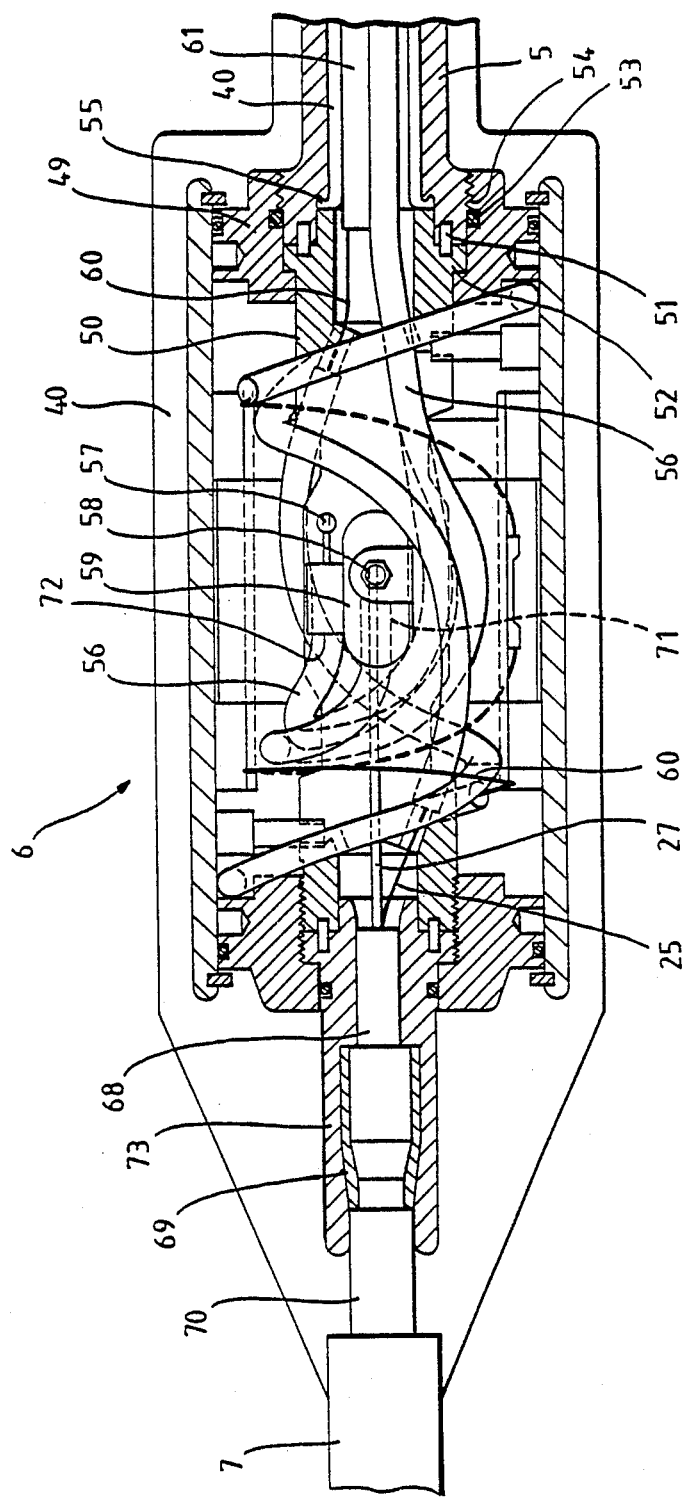
FIG. 4 shows a modified cable to cable joint for use in the jointing arrangement. (For reasons of clarity, not all sectioned surfaces are shown cross-hatched in this Figure.)

Referring to FIG. 4, the MCCJ 6 is a modified version of a cable to cable joint as described in our co-pending EP patent application No. 67673. The differences between the MCCJ 6 and the joint referred to, hereinafter called the reference joint, are necessary generally because the electrical insulation requirements are different. The reference joint is made between two cable ends which are at the same electrical potential. The MCCJ 6, as mentioned above; is made between a cable 7 which is at system potential and (via the coupling member 5 and tension transfer housing 4) the flexible hose 1 which is at earth potential, in use. It is convenient to provide, in addition to the insulation provided by the polythene layer 40 described above, an electrically insulated path out of the MCCJ 6 to and through the hose 1 for the electrical power and any electrical signals carried by the electrical elements of the optical fibre cable 7.

It should be noted that the optical fibre cable 7 comprises a central king wire 27, surrounded by a plurality of optical signal elements 25 (only one shown). Both king wire 27 and signal elements 25 are carried in an electrically conductive tube 68. Tensile strength is provided by axially extending high tensile steel wires 69 which constitute an annular tensile layer which lies concentrically outside the conductive tube 68. Lying concentrically outside the steel wires 69 is a further, protective tube 70. Electrical power and signals can be carried by any or all of the king wire 27, conductive tube 68, steel wires 69 and protective tube 70.

Only the differences between the MCCJ 6 and the reference joint will be described.

The coupling 5 which extends between the transfer housing 4 and the MCCJ 6, in the form of a tube, is provided with a screw thread 54 on its outer surface in the region of, but not immediately adjacent to, its end. At its end face, the coupling 5 abuts a central tensile member 50 of the MCCJ 6 and dowels 51 are provided, extending across the abutment plane, which inhibit relative rotation between the member 50 and the coupling 5. The central tensile member 50 is of the same type as that used in the reference joint but is provided with a circumferential shoulder 52. The shoulder gives an abutment surface facing in the direction of the MCCJ 6. An internally threaded bulkhead 49 is provided with a complementary shoulder and is mounted across the junction between the coupling 5 and the central tensile member 50. The complementary shoulder of the bulkhead 49 bears against the circumferential shoulder 52 of the central tensile member 50 while the internal thread of the bulkhead 49 cooperates with the thread 54 on the coupling 5 to secure the bulkhead 49 to the coupling 5. Seals 53 are provided between the bulkhead 49 and the coupling 5.

The polythene layer 40 terminates in the region of the abutment plane in which the end face of the coupling 5 abuts the central tensile member 50 of the MCCJ 6. It is convenient that the bore of the coupling 5, together with the end of the central tensile member 50, provide a circumferential groove 55 of keyhole type cross-section, similar to the groove 36' provided in the second region 36 of the waterproof gland 24. The polythene layer 40 extends into, and terminates in, this groove 55, being retained therewith.

It will be seen that in this arrangement the polythene layer 40 provides insulation substantially throughout the bore of the coupling 5. This acts to reduce the risk of electrical "arcing" or "tracking" occurring along the bore between the hose 1 and the MCCJ 6.

The electrically insulated path out of the MCCJ 6 is provided by polythene insulated copper wires 56, 71. These wires 56, 71 terminate at one end in the MCCJ 6 and pass through the coupling 5, tension transfer housing 4, and flexible hose 1 to the repeater housing bulkhead 2 and the mounting 15 associated therewith for power and signal feed through to the repeater equipment 16 beyond.

The conductive tube 68, steel wires 69 and protective tube 70 of the cable 7 all terminate within an electrically conductive ferrule 73 which in turn is in contact with the central tensile member 50. Any electrical power or signals carried by the conductive tube 68, steel wires 69 and protective tube 70 are transmitted to the central tensile member 50 which is also electrically conductive. A first of the insulated copper wires 56 is connected to the central tensile member 50 by means of a terminal 57 mounted directly on the latter. The king wire 27 however is connected in the MCCJ 6 to a terminal 58 which is mounted by means of an insulating nylon terminal block 59 on the central tensile member 50. A second of the insulated copper wires 71 is connected via the latter terminal 58 to the king wire 27. By this arrangement electrical power, and signals if required, can be transmitted independently through the MCCJ 6 to the hose 1 from either the king wire 27 or the combination of the conductive tube 68, steel wires 69 and protective tube 70. The nylon terminal block 59 further conveniently provides clamping 72 for the first insulated copper wire 56.

The optical signal elements 25 of the optical fibre cable 7 are jointed as they would be in the reference joint. However, instead of being jointed to optical signal elements of a further length of submarine optical fibre cable, the optical signal elements 25 (only one shown) are jointed each to an optical fibre tail 60. A nylon duct 61 is provided through which the fibre tails 60 pass. The nylon duct 61 extends from the internal cavity of the MCCJ 6, substantially in parallel with the polythene insulated copper wires 56, 71 to terminate in the region of the repeater housing bulkhead 2. The fibre tails 60 extend beyond the nylon duct 61, through the bulkhead 2 by means of the mounting 15 provided, to terminate at the repeater equipment 16 (this arrangement not shown).

It will be understood that the electrical conditions, in use, of the jointing arrangement described above will not necessarily apply to all cases in which the arrangement may find application. For instance the flexible hose 1 and MCCJ 6 may not be at different electrical potentials. In such circumstances the electrical insulation provisions described above may be unnecessary or inappropriate.

Although no bend limiting device is described above, it will be clear that in the case of an optical fibre cable it would be important that a minimum bend radius be imposed on the jointing arrangement since the transmission performance of optical fibres can be badly affected by over bending. To impose such a minimum bend radius, either the hose 1 could be designed as a bend limiter in itself or an independent bend limiter could be mounted between the MCCJ 6 and the repeater housing 3, to encompass the hose 1. If an independent bend limiter is used, it can offer an alternative route for transfer of tensile load between the cable 7 and the repeater housing 3. That is, the bend limiter could be designed to carry tensile load in a suitable manner, allowing the hose to be designed without the constraint mentioned above that it should be capable of carrying significant tensile loads.

Another option offered by an independent bend limiter is that it may, in place of the hose 1, be designed to withstand the pressure of a submarine environment. If the arrangement is so, the hose 1 may be designed without such a constraint, instead of as described above.

In order to assemble a joint between an optical fibre submarine cable and a repeater housing incorporating a jointing arrangement according to an embodiment of the invention, it is convenient to attach the optical fibre tail or tails 60 first to the repeater apparatus 16. Each fibre tail 60 can then be brought through the appropriate repeater housing bulkhead 2, and subsequently threaded along the duct 61 in the hose 1 to the MCCJ 6.

Because the fibre tails 60 can be so threaded along the duct 61, if it is necessary to gain access to one only of the fibre tails 60, for instance to replace it, it is possible to withdraw the relevant fibre tail 60 from the duct 61 and to rethread it, or a replacement, without significantly disturbing any other fibre tail 60. In this respect it is advantageous if each fibre tail 60 is provided with an individual feed through gland at the repeater housing bulkhead 2 since if each tail 60 is so provided, it can be replaced through the bulkhead 2 also without disturbance to any other fibre tail 60.

I claim:

1. An optical fibre submarine cable repeater assembly comprising:
    an optical fibre submarine cable repeater housing including repeater means therewithin;
    a jointing housing which is separate from but mechanically connected to said repeater housing by a flexible hose means having at least one duct therethrough; and
    at least one optical fibre tail which is optically coupled to said repeater means at one end and slidably received within said duct with the other end of said optical fiber tail being located in said separate jointing housing.

2. A submarine jointing assembly for flexibly interconnecting a submarine optical fibre cable and a repeater housing, the repeater housing having disposed within it repeater apparatus having an optical fibre core extending therefrom and the submarine cable comprising an optical fibre core surrounded by tensile load carrying components, the assembly comprising:
    a flexible tensile load carrying component for attachment to the repeater housing, said component comprising a flexible tubular strength member provided at one end with means for attachment to the repeater housing and at the other end with means for attachment to the tensile load carrying components of the submarine cable,
    a duct extending along said flexible tubular strength member for slidingly receiving the optical fibre core extending from the repeater apparatus, and means for supporting a core joint between the core of the submarine cable and the core extending from the repeater apparatus at the end of the flexible interconnection remote from the repeater housing.

3. In a submarine jointing assembly for flexibly interconnecting a submarine optical fibre cable and a repeater housing in which the submarine cable includes an optical fibre core surrounded by tensile load carrying components that are provided with means for attachment to tensile load carrying members associated with the repeater housing and wherein the optical fibre core of the submarine cable is connected at a core joint to an optical fibre core extending from repeater apparatus within the repeater housing, the core joint being supported within the interconnection of the tensile load carrying members of the cable and repeater housing, the improvement comprising:
    the tensile load carrying member being associated with the repeater housing including a flexible tubular tensile strength member within which the optical fibre core extending from the repeater apparatus is slidingly threadable, the member having means for attachment of the tensile load carrying components of the cable to form a tensile member joint and the core joint is supported remote from the repeater on the submarine cable side of the flexible tensile member and is accessible without unthreading the tubular strength member.

4. The jointing assembly of claim 3 wherein the flexible tubular member is separable from the repeater housing and is provided, at its end remote from attachment to the submarine cable, with means for mounting the flexible tubular member on a bulkhead of the repeater housing.

5. The jointing assembly of claim 3 or 4, duct for slidably receiving the optical fiber core from the repeater housing.

6. The jointing assembly of claim 5 wherein the duct comprises nylon.

7. The jointing assembly of claim 3, further comprising an electrically conductive coupling element for electrical connection to electrical power elements of the submarine cable.

8. The jointing assembly of claim 3, wherein the core joint is supported by a framework adapted to hold optical fibre joints in a fixed relationship to one another.

9. The jointing assembly of claim 8 further comprising an electrically insulated wire, electrically connected at one of its ends to the electrically conductive coupling element and extending along the bore of the tubular member such as to provide an electrical pathway from the coupling element, through the jointing assembly.

10. The jointing assembly of claim 3, wherein the means for attachment comprises means for electrically insulating the flexible tubular member from the submarine cable.

11. The jointing assembly of claim 10 in which the means for attachment has a mating portion that cooperates with a termination on the submarine cable and the means for electrically insulating comprises a coating of electrically insulating material on the mating portion.

12. The jointing assembly of claim 3 further comprising an insulated mounting for attachment of a king wire of the optical fibre submarine cable, there being further provided an electrically insulated wire which is connected at one of its ends to said insulated mounting and which extends along the bore of the hose to provide an independent, insulated electrical pathway from a king wire attached at the attachment point, through the jointing assembly.

13. The jointing assembly of claim 3 in which the flexible tubular member is provided with means for limiting its curvature at least in the region adjacent the repeater housing.

14. The jointing assembly of claim 13 in which the means for limiting curvature comprises a further tubular member mounted externally of the flexible tubular member and attached at one end to the repeater housing.

15. The jointing assembly of claim 3 in which the flexible tubular member is adapted for attachment to the repeater housing at a feedthrough where the optical fibre of the core passes through a hermetic seal.

16. The jointing assembly of claim 3 further comprising means for encasing an assembled joint between the cable and tubular member with a coating of electrically insulating material.

17. The jointing assembly of claim 16 in which the electrically insulating material is integral with means for electrically insulting the flexible tubular member from the submarine cable.

* * * * *